United States Patent
Kershaw et al.

(10) Patent No.: US 12,304,651 B2
(45) Date of Patent: *May 20, 2025

(54) MAXIMUM TAKEOFF WEIGHT DETERMINATION FOR AIRCRAFT

(71) Applicant: Gulfstream Aerospace Corporation, Savannah, GA (US)

(72) Inventors: Nicholas Kershaw, Savannah, GA (US); Jeffrey Hausmann, Savannah, GA (US)

(73) Assignee: GULFSTREAM AEROSPACE CORPORATION, Savannah, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/635,830

(22) Filed: Apr. 15, 2024

(65) Prior Publication Data

US 2024/0253813 A1    Aug. 1, 2024

Related U.S. Application Data

(63) Continuation of application No. 17/450,267, filed on Oct. 7, 2021, now Pat. No. 11,958,626.

(51) Int. Cl.
  *B64D 45/00* (2006.01)
  *G01G 19/07* (2006.01)
(52) U.S. Cl.
  CPC .............. *B64D 45/00* (2013.01); *G01G 19/07* (2013.01); *B64D 2045/0085* (2013.01)

(58) Field of Classification Search
  CPC ............ B64D 45/00; B64D 2045/0085; G01G 19/07; G08G 5/045; G08G 5/0021; G08G 5/0065; G08G 5/0091
  See application file for complete search history.

(56) References Cited

U.S. PATENT DOCUMENTS

| | | | |
|---|---|---|---|
| 9,710,145 B2* | 7/2017 | Zammit-Mangion | B64D 43/02 |
| 9,849,999 B1* | 12/2017 | Fymat | B64D 45/00 |
| 2002/0055816 A1* | 5/2002 | H. Chamas | G01M 1/125 701/124 |
| 2003/0229426 A1* | 12/2003 | Griffin, III | G01D 7/04 701/3 |
| 2010/0102173 A1* | 4/2010 | Everett | B60T 8/1755 244/175 |
| 2013/0238173 A1 | 9/2013 | Burns et al. | |

(Continued)

Primary Examiner — Mussa A Shaawat
(74) Attorney, Agent, or Firm — Lorenz & Kopf, LLP

(57) ABSTRACT

An aircraft has a first principles takeoff processor (PCE), a predictive flight envelope protection processor (PFEP), and a maximum takeoff weight processor. The PCE is programmed to predict a liftoff location and an energy state of the aircraft at a liftoff on a runway. The PFEP is programmed to assess each of a plurality of potential trajectories for compliance with or violation of a predetermined flight envelope. The maximum weight processor is programmed to: indicate that the aircraft may takeoff at the aircraft weight when any one of the plurality of potential trajectories is in compliance with the predetermined flight envelope; iteratively reduce an input of the aircraft weight to the PCE until the PCE indicates that any one of the plurality of potential trajectories is in compliance with the predetermined flight envelope; and indicate that the input of the aircraft weight as reduced is a maximum allowable takeoff weight.

20 Claims, 2 Drawing Sheets

(56) References Cited

U.S. PATENT DOCUMENTS

| | | | |
|---|---|---|---|
| 2013/0271300 A1 | 10/2013 | Pepitone et al. | |
| 2015/0362920 A1* | 12/2015 | McGregor | G08G 5/0043 |
| | | | 701/15 |
| 2016/0349103 A1* | 12/2016 | Creacy | G01G 19/07 |
| 2019/0120684 A1* | 4/2019 | Oren | G01G 19/12 |
| 2020/0066171 A1 | 2/2020 | Prosser et al. | |
| 2020/0369384 A1* | 11/2020 | Kelly | G08G 5/006 |
| 2021/0018938 A1* | 1/2021 | Qian | G06T 7/11 |
| 2022/0024601 A1* | 1/2022 | Horne | G05D 1/0661 |

* cited by examiner

MAXIMUM TAKEOFF WEIGHT DETERMINATION FOR AIRCRAFT

CROSS-REFERENCE TO RELATED APPLICATIONS

This application is a continuation of U.S. application Ser. No. 17/450,267, filed Oct. 7, 2021

TECHNICAL FIELD

The present disclosure relates generally to aircraft and aircraft systems that calculate a maximum takeoff weight. More particularly the disclosure relates to modeling custom alternative departure procedures at various weights for a single engine takeoff and testing the custom alternative departure procedures for compliance with a flight envelope.

BACKGROUND

This section provides background information related to the present disclosure which is not necessarily prior art.

Many airports have a defined lateral and vertical departure path known as a Standard Instrument Departure (SID). Pilots must plan to execute the SID even in the unlikely event of an engine failure after takeoff. However, due to the reduced climb performance available in an engine-out situation, it is possible that the aircraft may be unable to meet the SID-required climb gradient.

If the aircraft is not able to meet the SID-required climb gradient, the pilots have two options. The first option is to reduce the weight of the aircraft by either reducing the number of passengers, eliminating cargo, or reducing the amount of fuel on board. In most cases, reducing the number of passengers or baggage is not an option. Reducing the amount of fuel on board can either mean the trip can't be flown safely or it may drive a need to perform one or more intermediate stops to refuel prior to the intended destination. Neither of those outcomes is desirable.

The second option is to execute an alternate departure procedure with a lower climb gradient. There are two main challenges with these alternate departure procedures (also known as Obstacle Departure Procedures (ODPs) and Special Obstacle Departure Procedures (SODPs)). Challenge one is that the ODP/SODPs are created by 3rd party companies with differing methods and processes which are typically not validated by any testing (simulated) or constrained by any maximum complexity limitations (meaning multiple actions required by crew to stay on desired flight path). The second challenge is that the procedures are not included in onboard Flight Management System (FMS) databases and therefore the pilots must reference on paper or electronic versions during a period of very high workload to establish the proper flight path. Airline pilots are likely to have practiced the alternative departure procedures, but business aviation pilots will likely never have previously practiced the ODP/SODP.

SUMMARY

The embodiments described herein describe a system that allows the crew to know the maximum fuel they can have onboard to depart an airport in the event of an engine failure, and a way for the flight crew to execute the single engine departure with the lowest workload possible so they can safely complete the takeoff and departure.

In a first non-limiting embodiment, an aircraft has an aircraft weight and includes a first principles takeoff processor, a predictive flight envelope protection processor, and a maximum takeoff weight processor. The first principles takeoff processor is programmed and configured to: predict a liftoff location and an energy state of the aircraft at a liftoff on a runway based on the aircraft weight and on environmental conditions. The predictive flight envelope protection processor is programmed and configured to: receive the energy state and the liftoff location from the first principles takeoff processor; generate a plurality of potential trajectories of the aircraft from the liftoff location based on the energy state; and assess each of the plurality of potential trajectories for compliance with or violation of a predetermined flight envelope. The maximum takeoff weight processor is programmed and configured to: indicate that the aircraft may takeoff at the aircraft weight in response to the predictive flight envelope protection processor determining that any one of the plurality of potential trajectories is in compliance with the predetermined flight envelope; iteratively reduce an input of the aircraft weight to the first principles takeoff processor in response to the predictive flight envelope protection processor determining that all of the plurality of potential trajectories violate the predetermined flight envelope, iteratively reducing until the predictive flight envelope protection processor indicates that any one of the plurality of potential trajectories is in compliance with the predetermined flight envelope; and indicate that the input of the aircraft weight as iteratively reduced is a maximum allowable takeoff weight.

In a second non-limiting embodiment, an aircraft takeoff weight protection system for an aircraft with an aircraft weight includes a first principles takeoff processor, a predictive flight envelope protection processor, and a maximum takeoff weight processor. The first principles takeoff processor is programmed and configured to: predict a liftoff location and an energy state of the aircraft at a liftoff on a runway based on the aircraft weight and on environmental conditions. The predictive flight envelope protection processor is programmed and configured to: receive the energy state and the liftoff location from the first principles takeoff processor; generate a plurality of potential trajectories of the aircraft from the liftoff location based on the energy state; and assess each of the plurality of potential trajectories for compliance with or violation of a predetermined flight envelope. The maximum takeoff weight processor is programmed and configured to: indicate that the aircraft may takeoff at the aircraft weight in response to the predictive flight envelope protection processor determining that any one of the plurality of potential trajectories is in compliance with the predetermined flight envelope; iteratively reduce an input of the aircraft weight to the first principles takeoff processor in response to the predictive flight envelope protection processor determining that all of the plurality of potential trajectories violate the predetermined flight envelope, iteratively reducing until the predictive flight envelope protection processor indicates that any one of the plurality of potential trajectories is in compliance with the predetermined flight envelope; and indicate that the input of the aircraft weight as iteratively reduced is a maximum allowable takeoff weight.

BRIEF DESCRIPTION OF THE DRAWINGS

The drawings described herein are for illustrative purposes only of selected embodiments and not all possible

DETAILED DESCRIPTION

In general, some embodiments described herein describe a system where processors recursively interact, with a first principles takeoff engine or performance calculation engine (PCE) providing maximum two-engine takeoff weights based on the reported or forecast environmental conditions at the departure airport. The environmental conditions may include temperature, winds, runway condition, pressure altitude, and other conditions that impact takeoff performance. Given an aircraft at that maximum takeoff weight, a predictive flight envelope protection processor can be executed to see if the aircraft can avoid all terrain and obstacles in the event of an engine failure given a set of input conditions representing the desired aircraft configuration (weight, CG). If not, the predictive flight envelope protection processor can execute recursively to find a flight path which requires the least climb gradient, then pass that solution to the PCE to determine the maximum takeoff weight that will result in terrain and obstacle clearance in the event of engine failure at the (regulatory) defined decision point during the takeoff roll. The PCE can then return the new input conditions to a predictive flight envelope protection processor system and re-run the calculations to verify or refine the overall solution. These operations can be run iteratively until divergence/stability criteria are met and the results presented to the crew. These solutions could be determined for all available runways on the airport and present the crew with all options.

Figure 1:
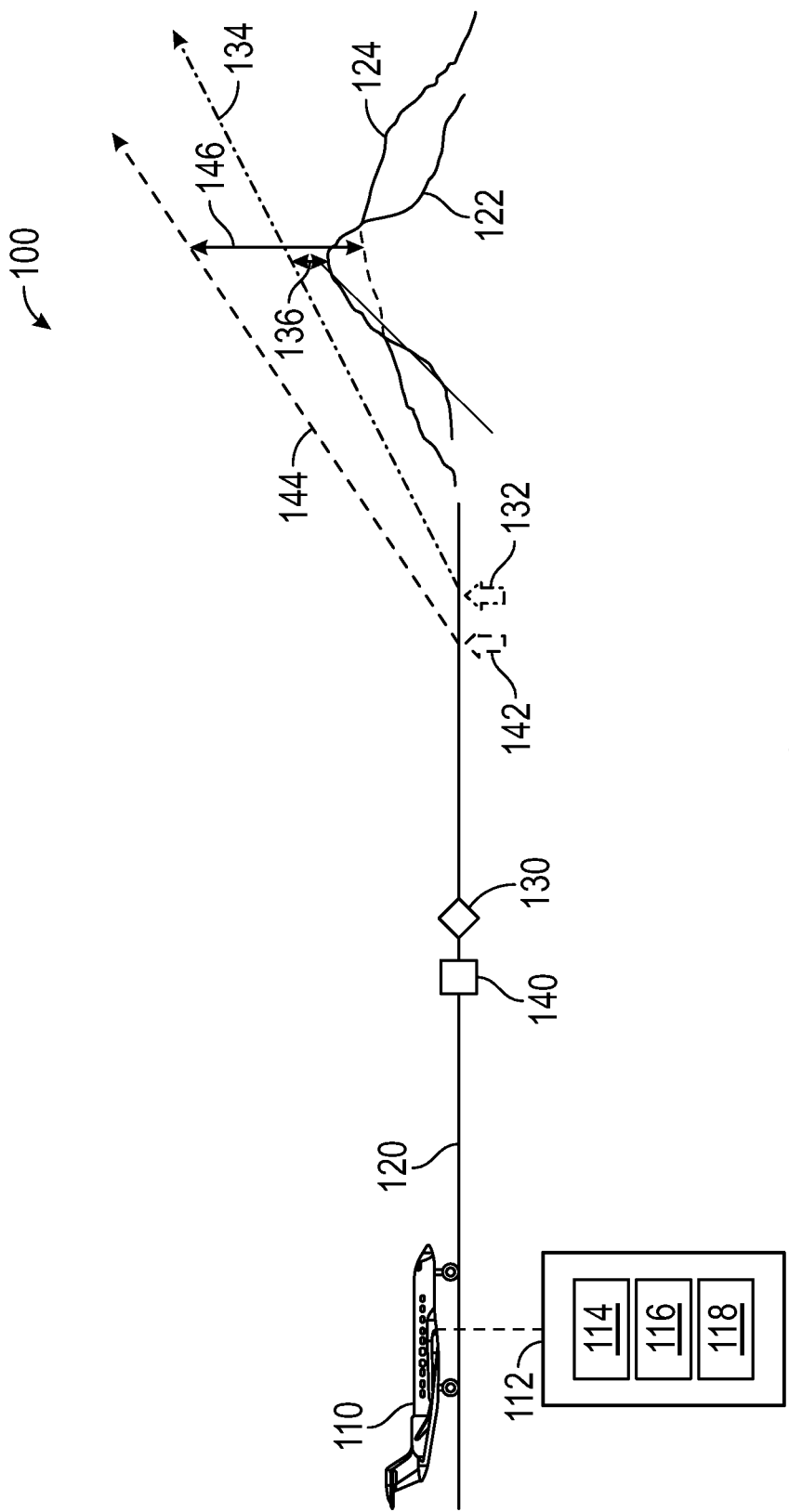
FIG. 1 is a side view of an aircraft with a maximum takeoff weight processor in a takeoff scenario in accordance with some embodiments.

With reference to FIG. 1 an exemplary aircraft takeoff scenario 100 is shown in a side view in accordance with some embodiments. An aircraft 110 has a control processor 112. The control processor 112 includes a first principles takeoff processor 114, a predictive flight envelope protection processor 116, and a maximum takeoff weight processor 118. The aircraft 110 is positioned on a runway 120 at a starting location for takeoff. A first obstacle 122 is located past the end of runway 120. A second obstacle 124 is located past the end of runway 120 and is laterally offset from the first obstacle 122, as shown by being behind obstacle 122.

During the mission planning portion of a flight up to just prior to takeoff, pilots will need to determine whether they can depart the airport given the current or anticipated weather conditions, available runways based on winds or runway availability, and finally with consideration to the aircraft mass. As a function of mission duration, it can often be critical that the aircraft can maximize the amount of fuel carried while still accommodating the number of passengers and cargo.

The control processor 112 uses reported or forecast weather to allow the pilots to determine—before taxi/takeoff—the maximum fuel they can have onboard to depart the airport in the event of an engine failure. In this case, it does not matter whether or not the airport has a published alternate departure procedure. For example, the control processor 112 may determine that aircraft 110 will reach V1 speed at decision point 130, will liftoff at liftoff point 132, will be able to fly path 134, and will clear the first obstacle 122 by distance 136 based on a first input weight for the aircraft 110.

If distance 136 is less than a safety factor distance for clearing obstacle 122, then the control processor 112 will use first principles takeoff processor 114, predictive flight envelope protection processor 116, and maximum takeoff weight processor 118 to repeatedly reduce the input weight and test the reduced input weight for compliance with the flight envelope. For example, the control processor 112 may reduce the weight input to first principles takeoff processor 114 to calculate a new decision point 140, a new liftoff point 142, a new path 144, and a new clearance 146 between the path 144 and the second obstacle 124. In the example provided, clearance 146 complies with the flight envelope and the reduced weight is indicated to the pilots as the maximum allowable takeoff weight.

The predictive processor 116 continuously evaluates multiple escape trajectories in front of the aircraft. There are broadly two types of predictive intervention. Firstly, if the pilots exceed specified flight envelope limits, predictive processor 116 will "nudge" them back into a normal flight envelope, thus avoiding a potential loss of control in-flight. Secondly, if the pilots are flying towards terrain, predictive processor 116 will intervene and safely maneuver the aircraft to avoid the terrain when the situation has progressed until there is only one possible escape trajectory remaining. The predictive processor 116 system accomplishes this using complex control laws, databases of performance capabilities and as mentioned previously—continuously calculating paths/trajectories to avoid terrain. The predictive processor 116 system includes a high-fidelity 3-dimensional ground map database and onboard navigational systems to determine the vehicle position and attitude relative to the terrain. In some embodiments, the predictive processor 116 is the predictive flight envelope protection system described in U.S. patent application Ser. No. 16/552,629 filed Aug. 27, 2019, which is incorporated herein by reference.

The first principles takeoff processor 114 is a first principles calculation engine (PCE) used to calculate aircraft field performance. The PCE uses first principles calculation methods to determine the required runway length (per FAA regulations) for a given set of environmental conditions, aircraft configuration, and aircraft mass. The PCE is primarily focused on reduction of complexity for flight crew in performing these calculations, while increasing accuracy and reducing unnecessary conservatism. In the example provided, the first principles takeoff processor 114 is the system described in FAA Advisory Circular 25.1581-1, Change 1.

Figure 2:
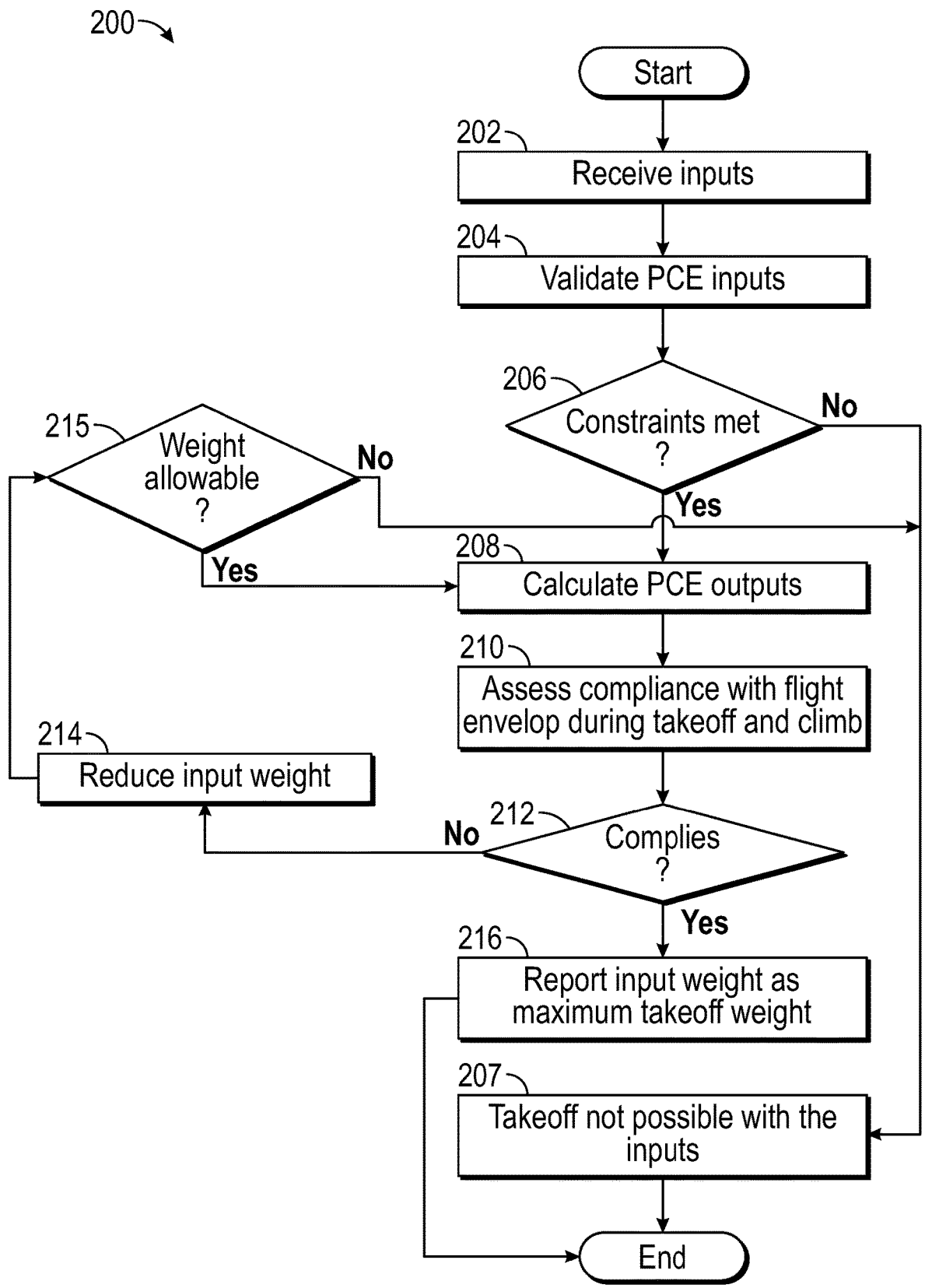
FIG. 2 is a flow diagram illustrating a method for reporting a maximum takeoff weight to a pilot of the aircraft of FIG. 1 in accordance with some embodiments.

Referring now to FIG. 2, and with continued reference to FIG. 1, a method 200 of alerting crew to a maximum allowable takeoff weight is illustrated in flow diagram form. In the example provided, tasks of method 200 are performed by control processor 112 for aircraft 110.

Task 202 receives inputs. For example, crew members may enter weight, balance, flight plan, airport, and conditions (e.g., dry, wet, contaminated) information into control processor 112. The control processor 112 may receive inputs from a Flight Management System including geo-location, flight plan (e.g., waypoints, altitudes, fuel required), and max gross weight information. The control processor 112 may receive weather service inputs such as wind, temperature, and pressure information. The control processor 112 may receive inputs from an airport database such as available runways, runway dimensions, and geo-location of takeoff starting point for each runway.

Task 204 validates PCE inputs. For example, control processor 112 may validate for each runway a runway direction, a wind direction and speed, environmental constraints, and elevation constraints. Task 206 determines whether the PCE constraints are met.

When the PCE constraints are not met, method 200 proceeds from task 206 to task 207. Task 207 indicates to the pilots that takeoff is not possible with the inputs provided.

When the PCE constraints are met, method 200 proceeds from task 206 to task 208.

Task 208 calculates the PCE outputs. For example, first principles takeoff processor 114 may calculate the field length required, the distance to liftoff, the speed at liftoff, and the climb gradient at liftoff based on input initial conditions for gross weight, runway dimensions, wind, temperature, pressure, and runway condition. In some embodiments, first principles takeoff processor 116 performs the calculations based on an engine loss at the decision point, representing what would happen if the pilots could not stop within the remaining runway and were operating without the use of an engine.

Task 210 assesses compliance with a flight envelope during takeoff and climb. For example, predictive processor 116 may take the takeoff point and energy state as computed by the first principles takeoff processor 116 as the initial conditions from which to calculate the predicted recovery flight paths. In the example provided, predictive processor 116 uses inputs for lift off speed Vr, liftoff latitude and longitude, thrust tables, temperature, pressure, airport, elevation, weight, and center of gravity information to calculate the predicted recovery flight paths. Predictive processor 116 uses a high-fidelity terrain database, thrust database, and environment parameters to determine whether any potential path complies with a pre-defined flight envelope. For example, predictive processor 116 may determine that a path flying over the second obstacle 124 requires a lower climb gradient and may comply with the flight envelope even when the SID path flying over the first obstacle 122 with a higher required climb gradient violates the flight envelope.

As used herein, the term "compliance a predetermined flight envelope" means that the predicted recovery flight paths will clear obstacles and terrain along the predicted recovery flight paths by a predetermined safe clearance distance. In some embodiments, the predetermined flight envelope includes operation limits such as maximum airspeeds, maximum climb gradients, and other limits that the aircraft should not exceed. In these embodiments with operation limits, task 210 will determine that the respective predicted recovery flight path violates the predetermined flight envelope when the aircraft is predicted to exceed the operation limits along the respective recovery flight path regardless of the terrain or obstacle clearance.

When task 212 determines that the inputs result in violation of the flight envelope, method 200 proceeds from task 212 to task 214. Task 214 reduces the input weight input to the PCE and proceeds to task 215. Task 215 determines whether the input weight as reduced by task 214 is allowable. For example, control processor 112 may determine whether the weight is less than or equal to a zero-fuel weight plus a safety margin. When the weight is too low, method 200 proceeds to task 207. When the weight is allowable, method 200 returns to task 208.

When task 212 determines that the inputs indicate compliance with the flight envelope, method 200 proceeds from task 212 to task 216. Task 216 reports the input weight—as may have been reduced in task 214—as satisfying the maximum takeoff weight. For example, control processor 112 may indicate that the initially entered weight results in a safe takeoff in the event of engine loss at the decision point if method 200 did not execute task 214. When control processor 112 did execute task 214, the reduced weight may be reported to the pilots as the maximum takeoff weight. In some embodiments, control processor 112 calculates the amount of fuel that may be carried based on the reduced input weight.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. An aircraft takeoff weight protection system, comprising:
   at least one processor configured to:
      iteratively selecting input aircraft weights for an aircraft and for each selected input aircraft weight:
         predict a liftoff location on a specified runway and an energy state of the aircraft at liftoff from the specified runway based at least in part on the selected input aircraft weight and on environmental conditions;
         generate a plurality of potential trajectories of the aircraft from the liftoff location on the specified runway based on the predicted energy state of the aircraft at liftoff from the specified runway;
         assess each of the plurality of potential trajectories to determine if any of the plurality of potential trajectories are in compliance with a predetermined flight envelope; and
      select as a maximum allowable takeoff weight for the aircraft an input aircraft weight where at least one of the plurality of potential trajectories is assessed to be in compliance with the predetermined flight envelope.

2. The aircraft takeoff weight protection system of claim 1, wherein the at least one processor is further configured to predict the liftoff location on the specified runway and the energy state of the aircraft at liftoff from the specified runway based further on an engine loss at a decision point past which the aircraft may not be able to stop within a remaining runway length.

3. The aircraft takeoff weight protection system of claim 2, wherein the at least one processor is configured to generate the plurality of potential trajectories based further on operation of the aircraft with the engine loss.

4. The aircraft takeoff weight protection system of claim 1, wherein the at least one processor is configured to assess each of the plurality of potential trajectories to determine if any of the plurality of potential trajectories are in compliance with a predetermined flight envelope by determining if any of the plurality of potential trajectories are in compliance with terrain clearance distances.

5. The aircraft takeoff weight protection system of claim 1, wherein the at least one processor is configured to assess each of the plurality of potential trajectories to determine if any of the plurality of potential trajectories are in compliance with a predetermined flight envelope by determining if any of the plurality of potential trajectories are in compliance with operational limits.

6. The aircraft takeoff weight protection system of claim 1, wherein the at least one processor is configured to iteratively select input aircraft weights by using a maximum gross weight of the aircraft as an initial value of the selected input aircraft weight and reducing the selected input aircraft weight until at least one of the plurality of potential trajectories is in compliance with the predetermined flight envelope.

7. The aircraft takeoff weight protection system of claim 1, wherein the at least one processor is further configured to alert a crew responsive to an estimated weight of the aircraft being greater than the maximum allowable takeoff weight.

8. The aircraft takeoff weight protection system of claim 1, wherein the at least one processor is further configured to determine a maximum amount of fuel that may be carried on the aircraft based on the maximum allowable takeoff weight.

9. The aircraft takeoff weight protection system of claim 1, wherein the at least one processor is further configured to predict the liftoff location on the specified runway and the energy state of the aircraft at liftoff from the specified runway based further on a weight balance of the aircraft and wind, temperature, and pressure as received from a weather service.

10. The aircraft takeoff weight protection system of claim 1, wherein the at least on processor is configured to predict the liftoff location on the specified runway and the energy state of the aircraft at liftoff from the specified runway based further on a runway dimension and a starting point for takeoff on the specified runway as received from an airport database.

11. An aircraft takeoff weight protection system, comprising:
at least one processor configured to:
iteratively selecting input aircraft weights for an aircraft and for each selected input aircraft weight:
predict a liftoff location on a specified runway and an energy state of the aircraft at liftoff from the specified runway based at least in part on the selected input aircraft weight and on environmental conditions and on an engine loss at a decision point past which the aircraft may not be able to stop within a remaining runway length, where the environmental conditions include wind, temperature and pressure;
generate a plurality of potential trajectories of the aircraft from the liftoff location on the specified runway based on the predicted energy state of the aircraft at liftoff from the specified runway and based further on operation of the aircraft with the engine loss;
assess each of the plurality of potential trajectories to determine if any of the plurality of potential trajectories are in compliance with a predetermined flight envelope, including terrain clearance distances and operational limits; and
select as a maximum allowable takeoff weight for the aircraft an input aircraft weight where at least one of the plurality of potential trajectories is assessed to be in compliance with the predetermined flight envelope.

12. An aircraft, comprising:
at least one processor configured to:
iteratively selecting input aircraft weights for the aircraft and for each selected input aircraft weight:
predict a liftoff location on a specified runway and an energy state of the aircraft at liftoff from the specified runway based at least in part on the selected input aircraft weight and on environmental conditions;
generate a plurality of potential trajectories of the aircraft from the liftoff location on the specified runway based on the predicted energy state of the aircraft at liftoff from the specified runway;
assess each of the plurality of potential trajectories to determine if any of the plurality of potential trajectories are in compliance with a predetermined flight envelope; and
select as a maximum allowable takeoff weight for the aircraft an input aircraft weight where at least one of the plurality of potential trajectories is assessed to be in compliance with the predetermined flight envelope.

13. The aircraft of claim 12, wherein the at least one processor is further configured to predict the liftoff location on the specified runway and the energy state of the aircraft at liftoff from the specified runway based further on an engine loss at a decision point past which the aircraft may not be able to stop within a remaining runway length.

14. The aircraft of claim 13, wherein the at least one processor is configured to generate the plurality of potential trajectories based further on operation of the aircraft with the engine loss.

15. The aircraft of claim 12, wherein the at least one processor is configured to assess each of the plurality of potential trajectories to determine if any of the plurality of potential trajectories are in compliance with a predetermined flight envelope by determining if any of the plurality of potential trajectories are in compliance with terrain clearance distances.

16. The aircraft of claim 12, wherein the at least one processor is configured to assess each of the plurality of potential trajectories to determine if any of the plurality of potential trajectories are in compliance with a predetermined flight envelope by determining if any of the plurality of potential trajectories are in compliance with operational limits.

17. The aircraft of claim 12, wherein the at least one processor is configured to iteratively select input aircraft weights by using a maximum gross weight of the aircraft as an initial value of the selected input aircraft weight and reducing the selected input aircraft weight until at least one of the plurality of potential trajectories is in compliance with the predetermined flight envelope.

18. The aircraft of claim 12, wherein the at least one processor is further configured to alert a crew responsive to an estimated weight of the aircraft being greater than the maximum allowable takeoff weight.

19. The aircraft of claim 12, wherein the at least one processor is further configured to determine a maximum amount of fuel that may be carried on the aircraft based on the maximum allowable takeoff weight.

20. The aircraft of claim 12, wherein the at least on processor is configured to predict the liftoff location on the specified runway and the energy state of the aircraft at liftoff from the specified runway based further on a runway dimension and a starting point for takeoff on the specified runway as received from an airport database.

* * * * *